United States Patent [19]

Dick et al.

[11] 4,249,916
[45] Feb. 10, 1981

[54] ABSORBER TOWER ISOLATION SYSTEM

[75] Inventors: David C. Dick, Richardson; James M. Hurt, Jr., Duncanville, both of Tex.

[73] Assignee: Texas Utilities Services, Inc., Dallas, Tex.

[21] Appl. No.: 61,692

[22] Filed: Jul. 30, 1979

Related U.S. Application Data

[62] Division of Ser. No. 13,188, Feb. 16, 1979.

[51] Int. Cl.³ .......................................... B01D 15/00
[52] U.S. Cl. ........................................ 55/73; 55/128; 55/288; 137/14; 137/15; 261/17; 261/109; 261/DIG. 9; 423/242
[58] Field of Search ................... 261/17, 109, DIG. 9, 261/DIG. 11, 64 R, 65; 422/49, 117, 118; 60/39.5; 137/14, 15; 425/812; 203/4, DIG. 7; 202/241, 242, 269, 270; 110/216; 55/73, 288, 128; 423/242 R, 242 A, 243, 244

[56] References Cited

U.S. PATENT DOCUMENTS

| 1,986,653 | 1/1935 | Wade .................................... 261/109 |
| 2,010,980 | 8/1935 | Coulson ................................ 261/109 |
| 2,070,370 | 2/1937 | Miller . |
| 3,196,086 | 7/1965 | Wethly ............................. 202/269 X |
| 3,249,117 | 5/1966 | Edwarde . |
| 3,297,550 | 1/1967 | Alberts ............................. 202/269 X |
| 3,433,349 | 3/1969 | Leach . |
| 3,520,649 | 7/1970 | Tomany et al. . |
| 3,638,925 | 2/1972 | Braemer ........................... 261/109 X |
| 3,761,064 | 9/1973 | Selway ............................. 261/109 X |
| 3,805,884 | 4/1974 | Burt et al. . |
| 3,852,408 | 12/1974 | Ewan et al. . |
| 3,897,773 | 8/1975 | Burt et al. . |
| 3,906,992 | 9/1975 | Leach . |
| 4,023,939 | 5/1977 | Juntgen et al. . |
| 4,060,398 | 11/1977 | Houle . |
| 4,067,778 | 1/1978 | Van Ackeren ................. 202/269 X |
| 4,133,852 | 1/1979 | DiNicolantonio et al. ..... 261/109 X |
| 4,145,258 | 3/1979 | Fujishiro et al. ................ 202/269 X |
| 4,168,208 | 9/1979 | Althoff et al. .................... 202/269 X |

Primary Examiner—Richard L. Chiesa
Attorney, Agent, or Firm—G. Roland Love

[57] ABSTRACT

An absorber tower maintenance isolation system for isolating an absorber tower while maintaining a steam generation plant in operation. An inlet blank-off plate and outlet blank-off plate cooperate with louver dampers in the inlet and outlet ducts to permit shut down or start up of an absorber tower. Closure devices and locking devices act to keep the blank-off plates in position. Equalization devices and duct vent holes allow release to the atmosphere. Further, access is provided to the absorber tower inlet and outlet ducts.

4 Claims, 12 Drawing Figures

ABSORBER TOWER ISOLATION SYSTEM

This is a division, of application Ser. No. 13,188, filed Feb. 16, 1979.

BACKGROUND OF THE INVENTION

1. Field of the Invention

This invention relates to isolation systems and more particularly to coal fired steam electric generation plant absorber tower isolation systems.

2. Description of the Prior Art

Because of increasing environmental standards, coal fired steam electric generation plants have been required to use absorber towers for the removal of $SO_2$ from the flue gas. Continuous operation of the steam electric plant is very important, and the reliability and need to perform routine maintenance of the absorber towers is such that, as direct components of steam electric generation plants, they may cause an unacceptable number of plant shut-downs. Therefore, it is necessary to be able to isolate absorber towers for repair while maintaining the operation of the plant with as many absorber towers as possible in order to satisfy environmental standards. There has been some suggestion of possibly using louver dampers, guillotine dampers, or butterfly valves. Further, there is suggestion of using a diversionary gate to direct flow in one direction or another. None of these methods have proven acceptable for complete isolation such that an individual may safely perform maintenance inside an inlet duct or absorber tower. Further, shut-down and start up procedures cannot be implemented in an acceptable manner.

SUMMARY OF THE INVENTION

The present invention permits the complete isolation of an absorber tower for maintenance purposes. In spite of the isolation, the steam electric plant may continue in operation and other absorber towers may operate. Blank-off plates are used in inlet and outlet ducts to the absorber towers along with a louver damper arrangement in each duct to allow such total isolation that an individual may enter the duct for maintenance purposes. Further shut-down and start-up procedures may be implemented using the isolation system without affecting the operation of the steam electric plant. This isolation system could be used in other situations where a particular system component is desired to be isolated while the main unit remains in operation.

DESCRIPTION OF THE PREFERRED EMBODIMENT

Figure 1:
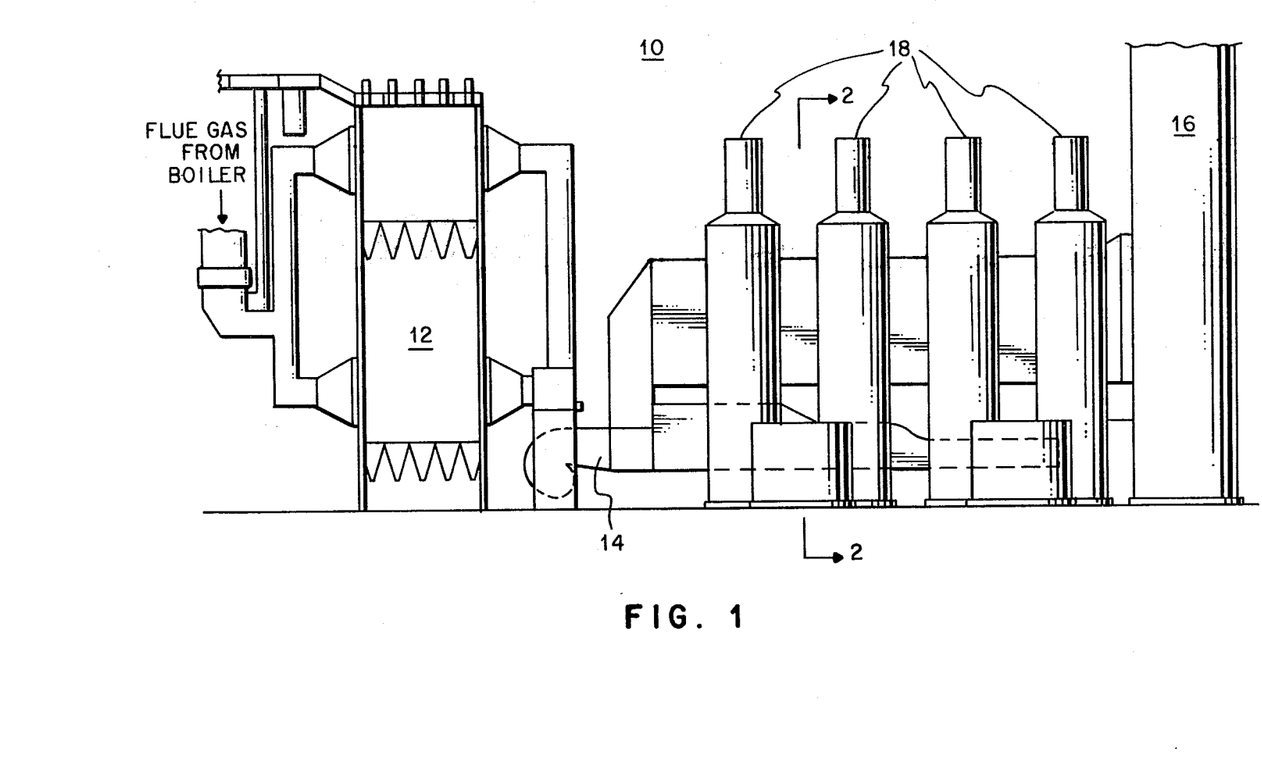
FIG. 1 is a side view of the flue gas cleaning system of a coal fired steam electric generation plant.
Figure 2:
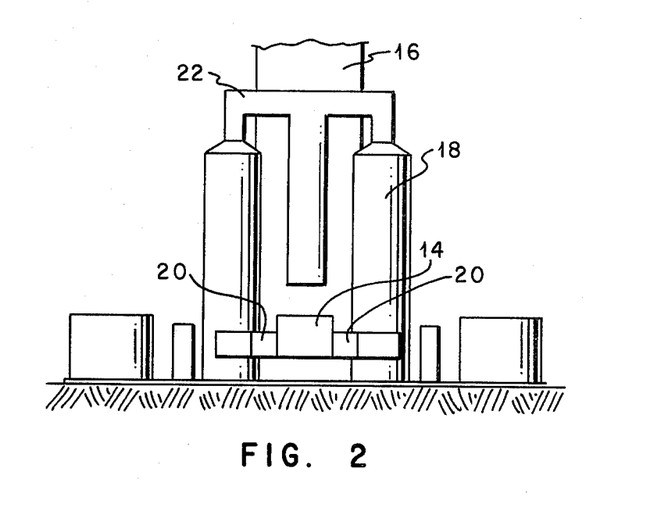
FIG. 2 is a view taken along the line 2—2 in FIG. 1.

Referring now to FIG. 1, a side view of the flue gas cleaning system 10 of a coal fired steam electric plant is shown. The basic elements of the flue gas cleaning system 10, relevant to this invention, are electrostatic precipitator 12, flue gas duct 14, chimney 16, and absorber towers 18. Inlet ducts 20 and outlet ducts 22 can be seen in FIG. 2.

Figure 3:
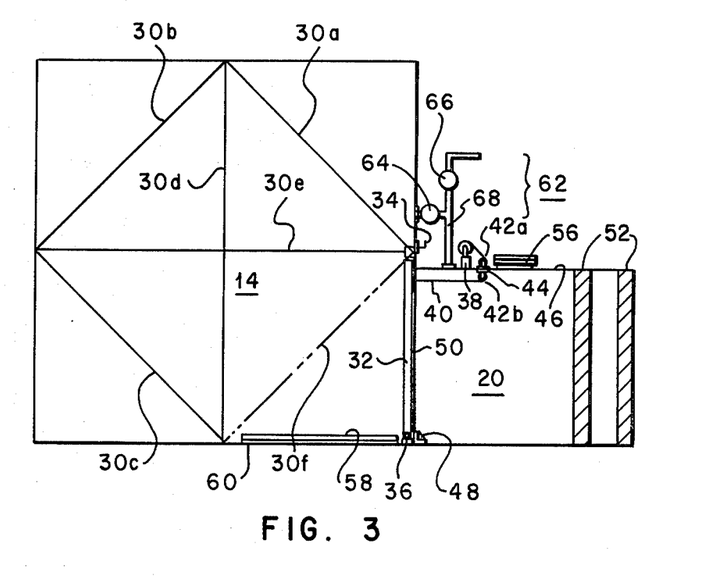
FIG. 3 is a cross-sectional view showing an inlet duct and isolation system.

The inlet duct isolation of an absorber tower 18 can be seen in FIG. 3. Looking into the flue gas duct 14, inlet duct supports 30a-e can be seen. Inlet duct support 30e has been added to a pre-existing duct support structure to compensate for the removal of inlet duct support 30f, shown by the phantom line.

Inlet duct 20 leads from the flue 14 to an absorber tower 18. A blank-off plate 32 is shown in the closed position, held by closure device 34. The blank-off plate 32 pivots on a shaft 36 as it is pulled closed by a winch 38 and a cable 40. Cable 40 is guided by rollers 42a and 42b through a hole 44 in the inlet duct upper wall 46. The blank-off plate 32 is pulled shut against a rest plate 48. Extra sealing may be provided by a double tadpole gasket 50, fastened to the entrance to the inlet duct, to meet the blank-off plate 32.

Also shown are double louver dampers 52 to be used for throttling gas flow. A duct vent hole 56 for access and pressure equalization is placed in wall 46. Further a deflector 58 and a door rest 60 can be seen for use when the blank-off plate 32 is in an open position. Finally, pressure equalization is achieved by the equalization device 62 which includes valves 64 and 66 and piping 68.

Figure 4:
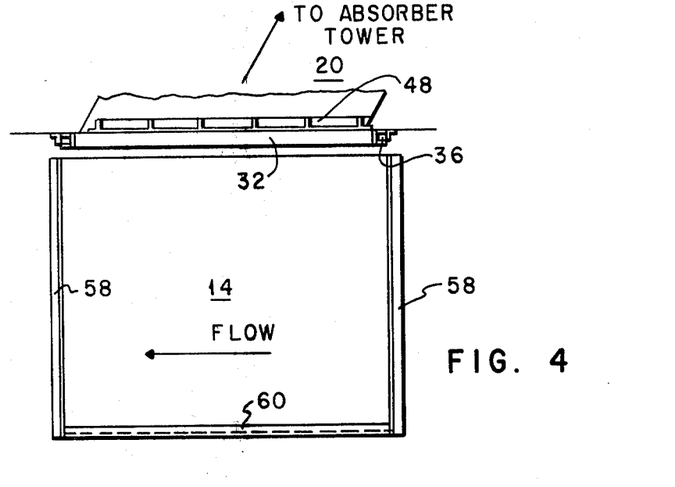
FIG. 4 is a top plan view of an inlet duct entrance.

Looking now at FIG. 4, the flue gas duct entrance is shown from above with the blank-off plate 32 in the closed position. The deflectors 58 and the door rest 60 can be seen from above. Also the door stop 48 is located to provide a sealing surface when the blank-off plate 32 is in the closed position.

Figure 5:
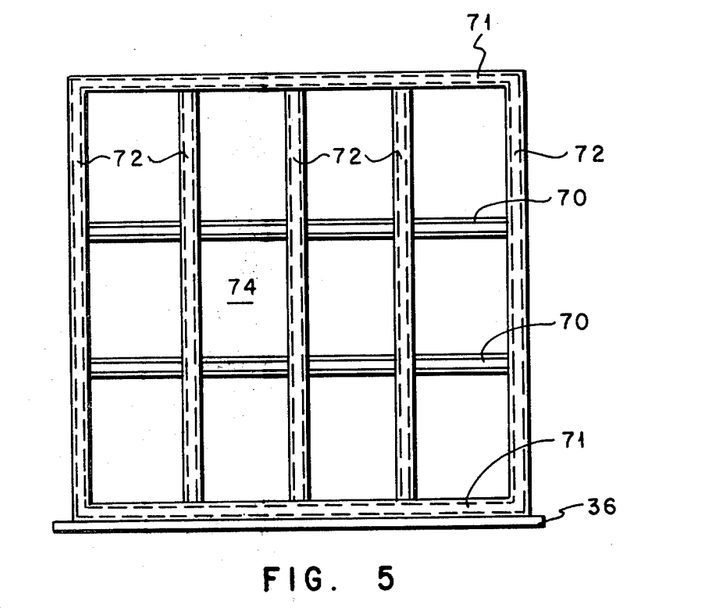
FIG. 5 is a structural view of an inlet blank-off plate.

The structure of the blank-off plate 32 is shown in FIG. 5. The plate rides or pivots on a shaft 36. The blank-off plate structure is a matrix of interior horizontal channels 70, outside horizontal structural tubing 71 and vertical structural tubing 72. This matrix supports a membrane 74. The inlet blank-off plate operates in about 350° F. in an abrasive atmosphere. The gas velocity is approximately 66 feet/second and the operating pressure ranges from 10" $H_2O$ to 60" $H_2O$. Consequently, structural steel is used for the inlet blank-off plate.

Figures 6, 7, 8:
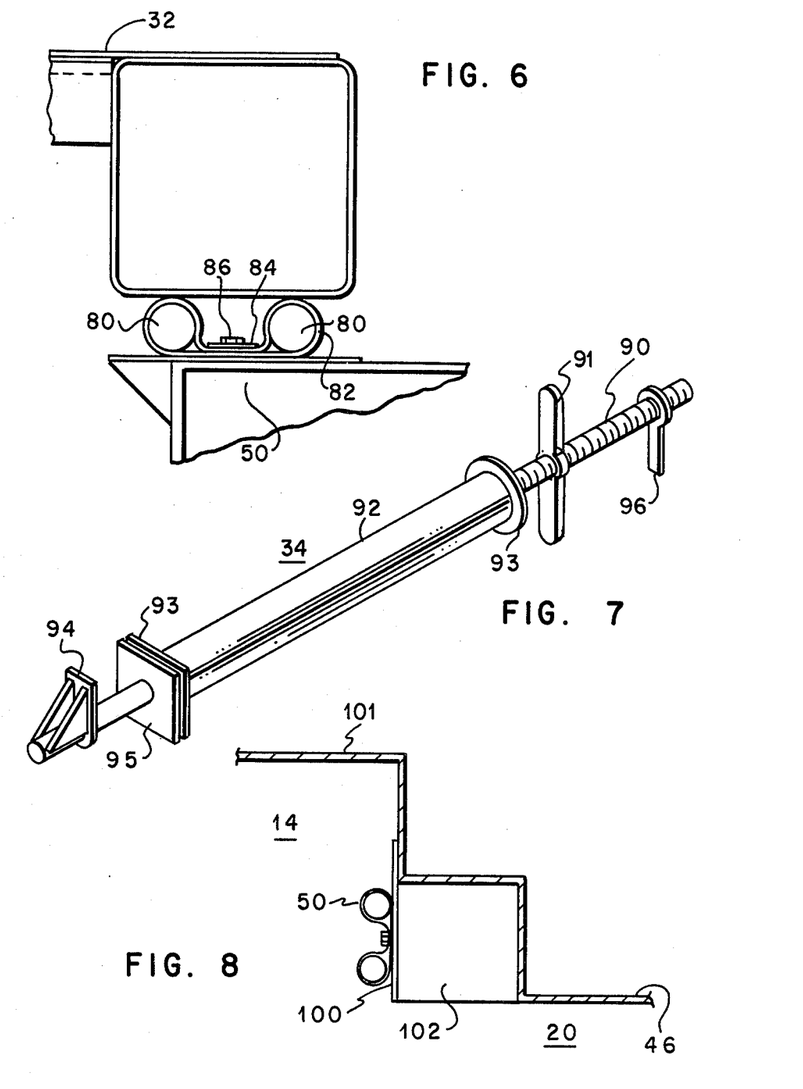
FIG. 6 is a sectional view of an inlet blank-off plate and double tadpole gasket.
FIG. 7 is a perspective view of a closure device.
FIG. 8 is a cross sectional view of a stepped inlet duct entrance.

FIG. 6 shows an enlarged view of the blank-off plate 32 meeting the tadpole gasket 50. In the preferred embodiments, the two cores 80 are a non-combustible material such as asbestos and are covered by a teflon impregnated asbestos cloth 82. The double tadpole gasket 50 is then held in place against the blank-off plate facing by a steel band 84 laid down the center of the double tadpole and fastened by bolts 86.

The closure device 34 can be seen in FIG. 7. A threaded shaft 90 is supported by shaft enclosure 92 in the flue 14 wall or the outlet duct wall 116. A foot 94 is attached to the internal end of the shaft 90, and a handle 96 is located on the external portion of the threaded shaft which also serves orientation purposes. The foot 94 pulls against the blank-off plate to provide positive closure or locking. In the same fashion, the foot 94 may pull against a tab, not shown, on the top of the blank-off plate for closure. This tab may then be used as a pushing surface by the foot 94 to assist in opening the blank-off plate. A tightening nut 91 on the threaded shaft 90 is used to tighten the foot 94 against the blank-off plate, thereby compressing the tadpole gasket 82. The tightening nut may be a spinner, hex nut or other form of tightening nut. Also shown are nylon bearings 93 at the ends of the shaft enclosure 92 for interfacing between the shaft enclosure 92 and the threaded shaft 90. A gasket 95 may also be used to minimize flue gas leakage.

As the flue gas duct 14 narrows towards the chimney 16, the stepped ceiling 101 of the flue gas duct 14 may require some modification for the closing of the blank-off plate 32. (See FIG. 8). This is accomplished be adding a plate facing 100 supported by a plate stiffener 102. In this manner a surface is provided for closing the blank-off plate 32 while the closure device 34 may still be inserted above the door for holding the blank-off plate in the closed position. The gasket 50 is shown mounted on the plate facing 100.

Figure 9:
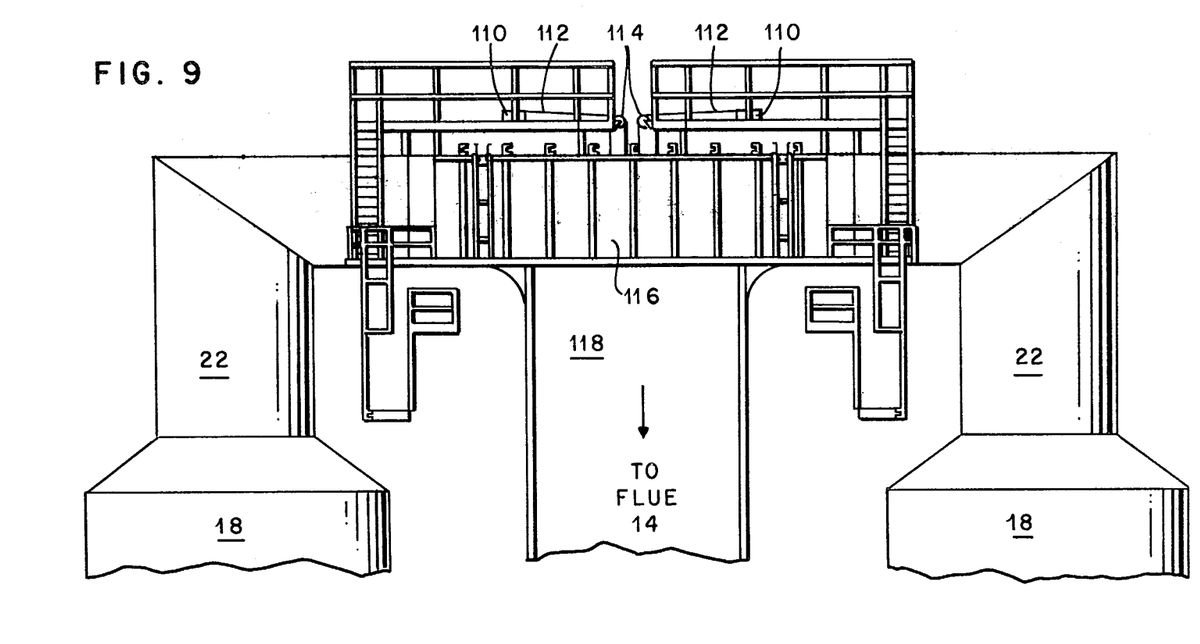
FIG. 9 is a side view showing the outlet ducts.

FIG. 9 is an external view of the outlet duct leading from the absorber towers 18 to the flue gas duct 14. The outlet blank-off plates are located in the horizontal portion 116 of the outlet duct 22. When the unit is in normal operation the blank-off plates are open and the flow is back to the flue 14 through the vertical portion 118. At the junctions of the horizontal portion of the outlet duct 116 and the flue access 118 are two outlet blank-off plates. Winches 110 operating cable 112 over the rollers 114 can also be externally seen. The rollers may be sheaves. Access means have also been illustrated in the drawing.

Figure 10:
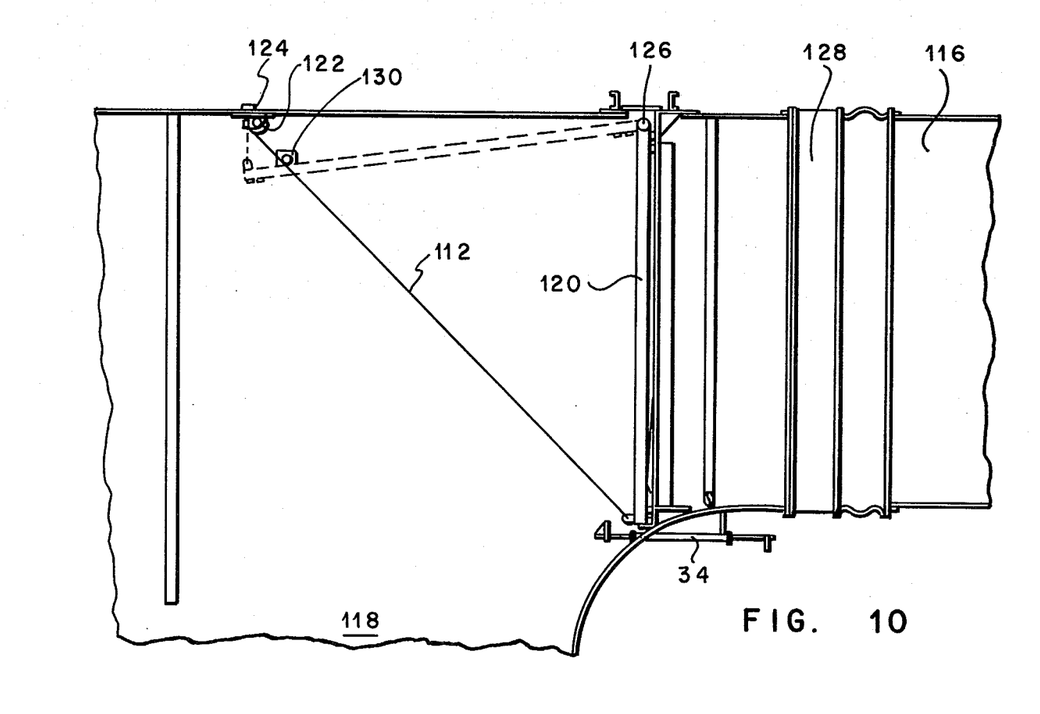
FIG. 10 is an out-away view of an outlet blank-off plate and isolation system.
Figures 11, 12:
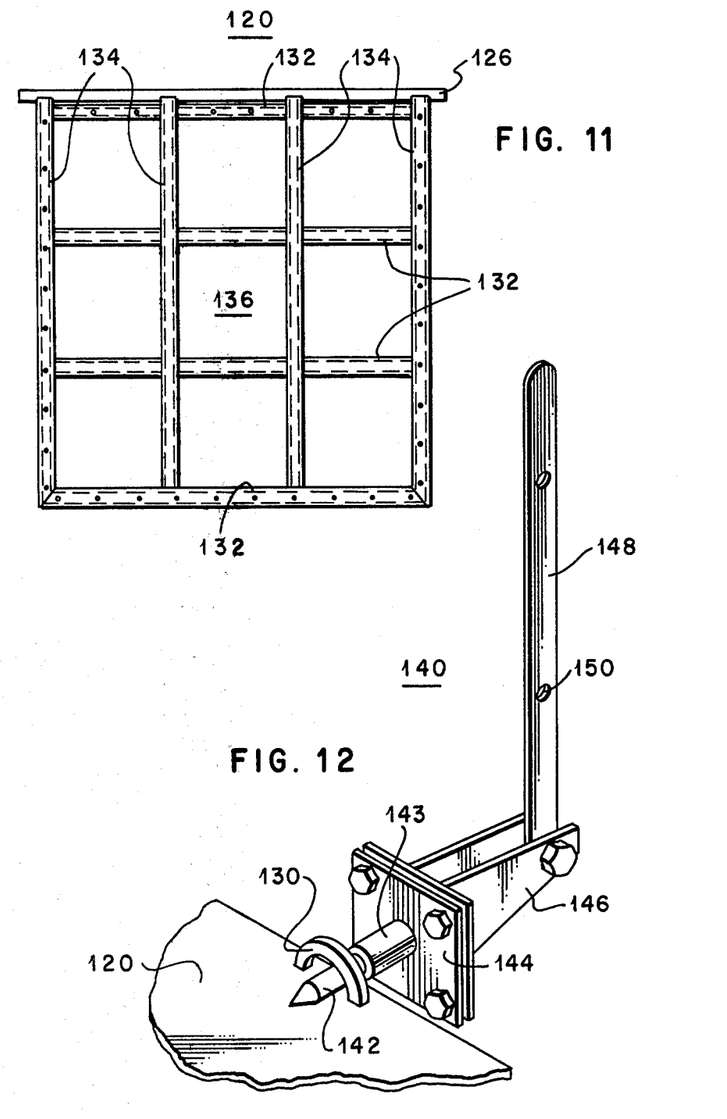
FIG. 11 is a structural view of an outlet blank-off plate.
FIG. 12 is a perspective view of a locking device.

In FIG. 10, one junction of the horizontal outlet duct 116 and the flue access 118 is shown cut away. The outlet blank-off plate 120 can be seen with cable 112 attached. The cable 112 has been led through a hole 124 in the outlet duct wall and over a roller 122. The blank-off plate 120 swings about a shaft 126. Also note the closure device 34 for the closed position. Phantom lines show the outlet blank-off plate in an open position and the lug 130 which is one portion of the latch-locking device as illustrated in FIG. 12. Also shown is one louver damper 128. The outlet blank-off plate 120 can be seen in FIG. 11. It is similar to the inlet blank-off plate 32, but is different in some respects which will be discussed. The horizontal shaft 126 is attached to a matrix of horizontal structural tubing 132 and vertical structural tubing 134. This matrix supports a membrane 136. For the outlet blank-off plate 120, the matrix swings or hangs from the shaft 126. Thus each vertical structural tubing member 134 is attached firmly to the shaft 126 while the inlet duct blank-off plate 32 has a horizontal structural tubing member supporting its matrix. Further, the outlet blank-off plate operates in a lesser temperature about 250° F. and is in a corrosive atmosphere. The outlet blank-off plate is preferably constructed of stainless steel. Also note that FIG. 10 shows a double tadpole gasket 138 attached to the outlet blank-off plate 120.

A latch-locking device 140 for the outlet blank-off plate 120 is shown in FIG. 12. A lug 130 is mounted on the blank-off plate 120 for receiving a rod 142. The rod 142 is attached to a baseplate 144 with mounting means 146 for a lever 148. Fulcrum point 150 of the lever 148 is positioned such that the rod 142 may be easily mated with the lug 130 when the outlet blank-off plate 120 is in an open position. Blank-off plate stop 143 positions lug 130 for placement of rod 142.

In operation the absorber towers are isolated from active operation by first closing the double louver dampers 52. The space between the double louver dampers can then be pressurized utilizing a seal air fan. At this point, the inlet blank-off plate is raised to closing and firmly closed by the closure device 34. Valve 64 is then closed while valve 66 is opened to release pressure in the inlet duct 120 to the atmosphere. The duct vent hole 56 may be opened to the atmosphere.

At this point the outlet louver damper 128 is closed, and the outlet blank-off plate 120 is unlocked and lowered to its closed position. A closure device 34 is used to firmly secure the door. A duct vent hole is not shown for the outlet duct but operates in the same manner as in the inlet duct to release the pressure between the door and damper to the atmosphere and open fully to the atmosphere.

If it is desired to start up the absorber towers, the man hole vents in both inlet and outlet ducts are closed. Then using the equalization device 62, valve 66 is closed and valve 64 is opened to pressurize the inlet duct. The inlet blank-off plate 32 may now be opened, and if any sealing air has been inserted between the double dampers 52 and 54 this is shut down. The double damper 52 and 54 may then be opened followed by the opening of the outlet blank-off plate 120. Finally the outlet damper 128 in the outlet duct is opened.

We claim:

1. In a flue gas desulphurization system used in a steam electric generating plant having a steam generator, a flue gas duct for conveying flue gas from the steam generator, at least one absorber tower for receiving, desulphurizing and returning the flue gas via lower inlet and upper outlet ducts between the flue gas duct and each absorber tower, dampers within the inlet and outlet ducts for regulating the flow of the flue gas, inlet and outlet blank-off plates for sealing the respective duct connections at the flue gas duct and discharging it to the atmosphere, a method for starting up an absorber tower that has been isolated for maintenance purposes comprising:

sealing the inlet and outlet ducts from the atmosphere;
equalizing the pressures in the main flue and inlet duct;
opening the inlet blank-off plate;
opening the inlet damper;
opening the outlet blank-off plate; and,
opening the outlet damper.

2. In a flue gas desulphurization system used in a steam electric generating plant having a steam generator, a flue gas duct for conveying flue gas from the steam generator, at least one absorber tower for receiving, desulphurizing and returning the flue gas via lower inlet amd upper outlet ducts between the flue gas duct and each absorber tower, dampers within the inlet and outlet ducts for regulating the flow of the flue gas, inlet and outlet blank-off plates for sealing the respective duct connections at the flue gas duct, and a chimney for receiving the desulphurized flue gas and discharging it to the atmosphere, a method for isolating each absorber tower during system operation for maintenance purposes comprising:

closing the damper in the inlet duct to reduce flue gas flow;
closing the inlet blank-off plate to stop flue gas flow;

releasing the pressure between the inlet blank-off plate and damper;
venting the inlet duct to the atmosphere;
closing the damper in the outlet duct;
closing the outlet blank-off plate;
releasing the pressure between the outlet blank-off plate and the damper; and
venting the outlet duct to the atmosphere.

3. The method of claim 2 wherein the inlet and outlet blank-off plates are locked after closing.

4. The method of claim 2 wherein the inlet duct damper is a double damper and a seal air flow is inserted into the double damper after closing to pressurize the space within the inlet duct damper.

* * * * *